US012017637B2

(12) United States Patent
Roy et al.

(10) Patent No.: US 12,017,637 B2
(45) Date of Patent: Jun. 25, 2024

(54) SYSTEM FOR IDENTIFYING ROAD TYPE

(71) Applicant: FORD GLOBAL TECHNOLOGIES, LLC, Dearborn, MI (US)

(72) Inventors: Judhajit Roy, Royal Oak, MI (US); Chenliu Stephen Lu, Northville, MI (US); W. Cary Cole, Wixom, MI (US); Jared King, Southfield, MI (US); Kyle Yeakle, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 17/527,713

(22) Filed: Nov. 16, 2021

(65) Prior Publication Data

US 2023/0150478 A1    May 18, 2023

(51) Int. Cl.
*B60W 20/20*    (2016.01)
(52) U.S. Cl.
CPC ......... *B60W 20/20* (2013.01); *B60W 2520/10* (2013.01); *B60W 2555/60* (2020.02); *B60W 2556/50* (2020.02); *B60W 2756/10* (2020.02)
(58) Field of Classification Search
CPC ............. B60W 20/20; B60W 2520/10; B60W 2555/60; B60W 2556/50; B60W 2756/10
See application file for complete search history.

(56) References Cited

U.S. PATENT DOCUMENTS

| | | | |
|---|---|---|---|
| 5,555,503 A * | 9/1996 | Kyrtsos | G05D 1/028 701/518 |
| 6,735,515 B2 | 5/2004 | Bechtolsheim et al. | |
| 8,095,290 B2 | 1/2012 | Smyth et al. | |
| 9,299,023 B2 | 3/2016 | Wilson | |
| 2009/0326750 A1* | 12/2009 | Ang | G01C 21/3469 701/1 |
| 2009/0326796 A1* | 12/2009 | Prokhorov | G08G 1/161 701/532 |

(Continued)

FOREIGN PATENT DOCUMENTS

| | | | |
|---|---|---|---|
| CN | 113370966 A | * | 9/2021 |
| DE | 102018218960 A1 | * | 5/2020 ............ B60W 10/06 |

OTHER PUBLICATIONS

Road Traffic Data (Year: 2008).*
DE-102018218960-A1 Translation (Year: 2008).*
CN-113370966-A Translation (Year: 2021).*

*Primary Examiner* — Jason Holloway
*Assistant Examiner* — Kyle T Johnson
(74) *Attorney, Agent, or Firm* — Joseph Zane; Brooks Kushman P.C.

(57) ABSTRACT

A vehicle includes an engine; an electric machine; a transceiver, programmed to communicate with a server; and a controller, programmed to responsive to identifying a route, obtain road data associated with the route via the transceiver, wherein the road data include locations of stop signs and traffic lights, and identify a sign classification using a sign and traffic light density calculated using a total number of stop signs and traffic lights within a lookahead distance on the route, identify a road type classification using the sign classification, responsive to determining the sign and traffic light density within the lookahead distance is above a threshold indicative of a city road type classification, adjust a drivetrain of the vehicle to reduce engine operation and increasingly propel the vehicle via the electric machine.

15 Claims, 3 Drawing Sheets

(56) References Cited

U.S. PATENT DOCUMENTS

| | | | |
|---|---|---|---|
| 2012/0010767 A1* | 1/2012 | Phillips | B60W 50/0097 |
| | | | 180/65.21 |
| 2012/0022764 A1* | 1/2012 | Tang | B60W 50/0097 |
| | | | 701/102 |
| 2012/0253605 A1* | 10/2012 | Denaro | B60W 10/06 |
| | | | 701/45 |
| 2013/0097562 A1* | 4/2013 | Kermoian | H04M 1/575 |
| | | | 715/841 |
| 2013/0110386 A1* | 5/2013 | Jin | B60W 40/06 |
| | | | 701/119 |
| 2015/0274028 A1* | 10/2015 | Payne | B60L 53/00 |
| | | | 903/903 |
| 2016/0216130 A1* | 7/2016 | Abramson | G01C 21/3423 |
| 2017/0316686 A1* | 11/2017 | Verheijen | G08G 1/09685 |
| 2019/0001985 A1* | 1/2019 | Jerger | B60W 10/08 |
| 2019/0126904 A1* | 5/2019 | Son | B60W 20/13 |
| 2020/0117204 A1* | 4/2020 | Lindemann | B60W 60/0023 |
| 2020/0294401 A1* | 9/2020 | Kerecsen | G05D 1/0287 |
| 2021/0116907 A1* | 4/2021 | Altman | H04W 4/44 |
| 2022/0227367 A1* | 7/2022 | Kario | B60W 30/0956 |
| 2022/0327843 A1* | 10/2022 | Belman | B60W 60/001 |
| 2023/0098688 A1* | 3/2023 | Zhang | B60W 50/06 |
| | | | 701/26 |
| 2023/0150478 A1* | 5/2023 | Roy | B60W 20/20 |
| | | | 701/22 |

* cited by examiner

SYSTEM FOR IDENTIFYING ROAD TYPE

TECHNICAL FIELD

The present disclosure generally relates to a vehicle system for identifying road type. More specifically, the present disclosure relates to a vehicle system to identify road type and driving condition using vehicle sensor input.

BACKGROUND

Vehicles may operate on a variety of roadways (e.g. highway, city, residential) having different driving conditions. Tailoring the vehicle power configurations to the appropriate roadway type may improve fuel economy and driver experience. For instance, a hybrid electric vehicle may be configured to more actively pull down the internal combustion engine and rely on the electric machine for propulsion in the city where stop and go traffic provides more opportunity for regenerative braking, and keep the engine running on the highway to provide better performance.

SUMMARY

In one or more illustrative example of the present disclosure, a vehicle includes an engine; an electric machine; a transceiver, programmed to communicate with a server; and a controller, programmed to responsive to identifying a route, obtain road data associated with the route via the transceiver, wherein the road data include locations of stop signs and traffic lights, and identify a sign classification using a sign and traffic light density calculated using a total number of stop signs and traffic lights within a lookahead distance on the route, identify a road type classification using the sign classification, responsive to determining the sign and traffic light density within the lookahead distance is above a threshold indicative of a city road type classification, adjust a drivetrain of the vehicle to reduce engine operation and increasingly propel the vehicle via the electric machine.

In one or more illustrative example of the present disclosure, a method for a vehicle includes responsive to identifying a route, obtaining road data associated with the route via a transceiver, wherein the road data include locations of traffic controls; and identify a traffic control classification using a traffic control density calculated using a total number of traffic controls within a lookahead distance on the route; identifying a road type classification using the traffic control classification; and adjusting a vehicle powertrain setting using the road type classification.

In one or more illustrative example of the present disclosure, a system for a vehicle includes a transceiver, programmed to communicate with a server; and a controller, programmed to responsive to identifying a route, obtain road data associated with the route via the transceiver, wherein the road data include locations of stop signs and traffic lights and speed limit information within a lookahead distance on of the route, and identify a sign classification using a sign and traffic light density calculated using a total number of stop signs and traffic lights within the lookahead distance on the route, identify a speed classification using the speed limit information, identify a road type classification using the sign classification and the speed classification, and adjust a vehicle powertrain setting using the road type classification.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for predicting a road type and adjusting vehicle operations accordingly. More specifically, the present disclosure proposes a system configured to identify and predict the road type based on various inputs including number of traffic lights and stops signs (traffic controls) within a predefined distance ahead of the vehicle. Frequent traffic lights and stop signs may be observed during a city driving and no traffic light or stop sign may be observed during highway driving. Therefore, the traffic light and stop sign information may facilitate the identification of road type by the vehicle.

Figure 1:
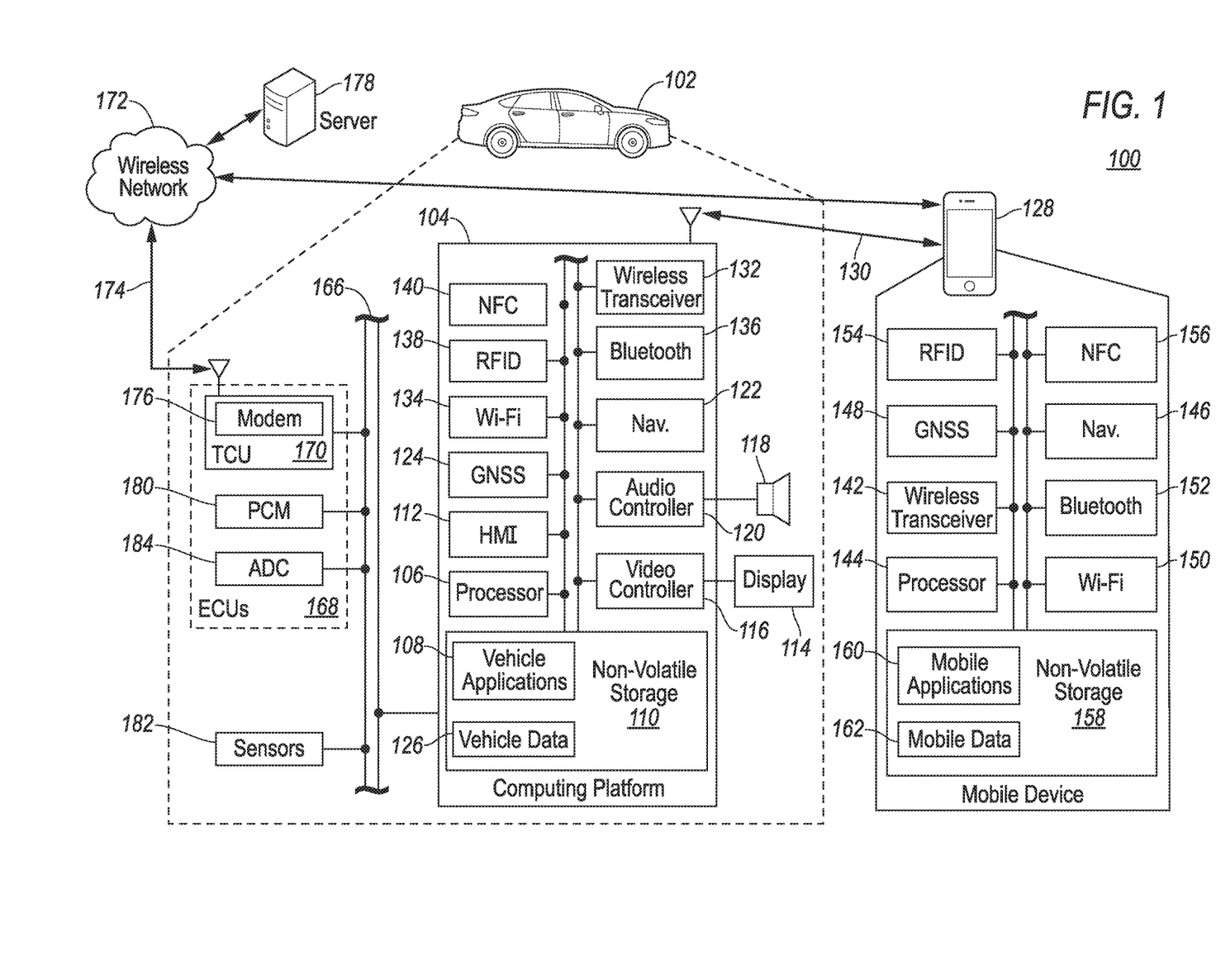
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and SQL.

The computing platform 104 may be provided with various features allowing the vehicle occupants/users to interface with the computing platform 104. For example, the computing platform 104 may receive input from HMI controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), GALILEO, BEIDOU, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a ZIGBEE transceiver, an IrDA transceiver, an ultra wideband (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various operations. For instance, the computing platform 104 may be configured to communicate with a TCU 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities. The ECUs 168 may further include a powertrain control module (PCM) 180 configured to operate powertrain of the vehicle 102. For instance, the PCM 180 may be configured to adjust vehicle powertrain and energy storage operation based on various inputs from the cloud server 178 and/or one or more sensors 182. The sensors 182 may include various types of electronic devices configured to sense objects at the vicinity of the vehicle 102 and generate signals to send to various vehicle components via the in-vehicle network 166. As a few non-limiting examples, the sensors 182 may include one or more cameras configured to capture images in front of the vehicle. Alternatively, cameras 182 may be a surrounding view camera. The sensors 182 may further include one or more radar sensors configured to detect object near the vehicle 102. the sensors 182 may further include one or more speed sensors and acceleration sensors configured to measure the speed and acceleration of the vehicle 102. The ECUs 168 may further include an autonomous driving controller (ADC) 184 configured to control an autonomous driving feature of the vehicle 102. Driving instructions may be received remotely from the server 178. The ADC 182 may be configured to perform the autonomous driving features using the driving instructions combined with navigation instructions from the navigation controller 122.

The PCM 180 may be configured to operate powertrain of the vehicle 102 based on a current and future road types (a.k.a. road conditions). The road type may be identified and predicted using one or more associated characteristics (such as speed limit and/or density of road signs and traffic lights). Table 1 below illustrates an example road classification table on one embodiment of the present disclosure. It is noted that the parameters presented in Table 1 are merely examples and the present disclosure is not limited thereto.

vehicle and the computing platform 104 may analyze the image and extract the input information in lieu of or in addition to the remote input information received from the server 178. As a few non-limiting examples each road type may correspond to a speed limit. The city road may correspond to less than 40 miles-per-hour (mph), whereas the residential road and highway may correspond to less than 50 mph and over 50 mph speed limits respectively. The road types may be further differentiated via signs and traffic lights associated with each different category. For instance, the city road may be associated with both stops signs and traffic lights, and it is very common for more than 4 stop signs and/or traffic lights to be present within 800 meters on a city road. In other words, if one or both of the above two conditions are met for a lookahead distance from the current location of the vehicle 102, there is a good chance that the road within the lookahead distance will be of the city road type although other characteristics may also be used for such an identification. Similarly, the residential road may be associated no traffic light/stop signs only. The density of the stop signs may be 1 or more per 1000 meters in the present example. The highway may be associated with no stop sign or traffic light.

The remote input information may further include form of way entry indicative of a characteristic of the road within the lookahead distance. In the present example, city roads may

TABLE 1

Road type classification

| Road Type | Remote input | | | | | Sensor input |
| --- | --- | --- | --- | --- | --- | --- |
| | Speed limit | Sign type | Sign/light (traffic control) density | Form of way | Functional Class | Current avg. speed/ Acceleration |
| City (low steady state, frequent stops, lot of idle, low speed limit) | <40 mph | Stop signs and traffic lights | >=4 in 800 m | Not Freeway | <=class 4 | 21 mph/ non-positive |
| Residential (moderate steady state, some stops) | <50 mph | Stop signs | >=1 in 1000 m | Not multiple carriageway | Any | 35 mph/ non-negative |
| Highway (high steady state) | >50 mph | N/A | N/A | Freeway | <=class 3 | 68 mph/ non-negative |

As illustrated in Table 1, the road types may be classified into a plurality of categories including, a city road category, a residential road category and a highway category each corresponding to a different driving condition. It is noted that although only three categories of road type are presented in Table 1, the present disclosure is not limited thereto any more or less of road types may be used to satisfy different design needs under essentially the same concept of the present disclosure. Each road type may be associated with one or more pre-assigned characteristics indicative of a general condition for the road. For instance, the city road may be associated with a "low steady state" characteristic due to the frequency speed change and stops, more often idling and low speed limits. The residential road may be associated with a "moderate steady state" with some stops. The highway traffic may be associated with a "high steady state" with no traffic light or stop sign. Each road type category may be further associated with a variety of remote input information received from the sources such as the cloud server 178 via the TCU 170. Additionally or alternatively, the remote input information may be at least partially captured via sensors 182 of the vehicle 102. For instance, the front-facing camera 182 may capture images ahead of the never include any freeways, and the residential roads may not include any multiple carriageways. Only highway road type may include freeways. The remote input may further include a functional class entry which assigns an arbitrary value to allow the vehicle 102 to further differentiate between each different road type. In addition, vehicle sensor data may be further relied upon to identify a current road type. For instance, the vehicle sensor data may include a current average speed and acceleration entry to facilitate the identification of the current road type by the vehicle 102.

Figure 2:
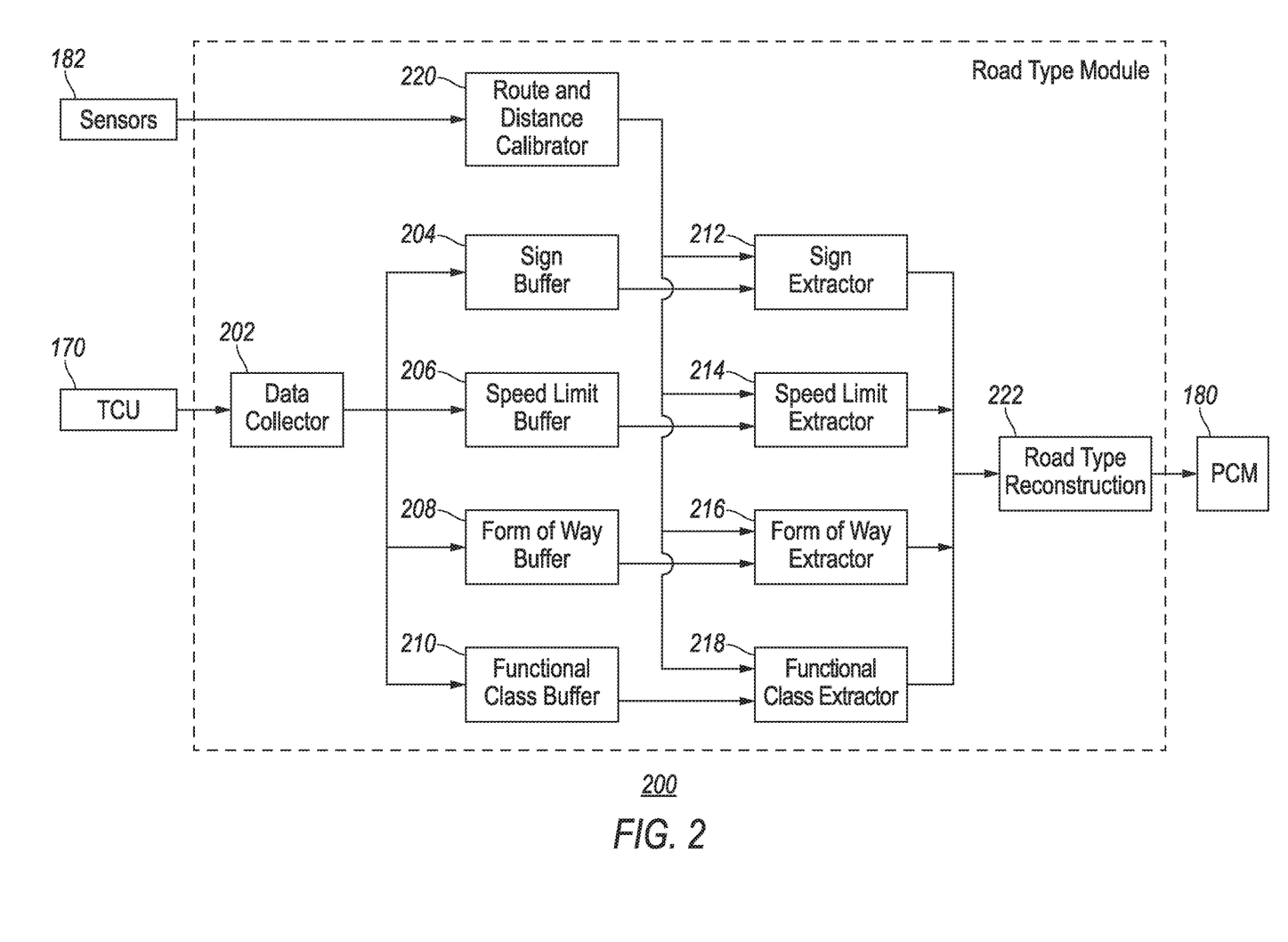
FIG. 2 illustrates an example block diagram for a road type module of one embodiment of the present disclosure.

Referring to FIG. 2, an example block diagram for a road type module 200 of one embodiment of the present disclosure is illustrated. With continuing reference to FIG. 1 and Table 1, the road type module 200 may be implemented via the computing platform 104 individually or in combination with other components of the vehicle 102. The road type module 200 may be configured to predict and identify road types using various data such as the data described with reference to Table 1. A data collector 202 may be configured to collect data from various sources. In the present example, the data collector 202 may collect road data from the cloud server 178 via the TCU 170. Additionally or alternatively, the road data may be collected from the mobile device 128 via the wireless transceiver 132. The mobile device 128 configured to pre-download the road data of a local area from the server 178 via a free-of-charge network (e.g. a home Wi-Fi) and store the data in the storage 158 as a part of the mobile data 162 to save data expenses. Alternatively, the mobile device 128 may selectively pre-download the road data on one or more given route predicted using data entries such as the user calendar appointment. Alternatively, the route may be provided by the navigation controller 122 of the computing platform 104. Responsive to the planning the route via the navigation controller 122, the computing platform 104 may send the route to the mobile device 128. The computing platform 104 may further instruct the mobile device 128 to download road data along the route via a free-of-charge network before a predicted time when the vehicle 102 is predicted to start the route. Responsive to receiving the road data by the data collector 202, the data may be classified into a plurality of categories and sent to the corresponding buffers. Road sign and traffic light data may be sent to a sign buffer 204 for temporary storage until further processing. As discussed above, the road sign and traffic light data may include information indicative of the location of the signs and traffic lights within a predefined distance from the current location of the vehicle 102. In one example, the road sign data may only reflect the location of stop signs. Alternatively, the road sign data may further reflect the location of other signs (e.g. yield signs or the like) depending on different design needs. The data collector 202 may be further configured to send the speed limit data to a speed limit buffer 206, the form of way data to a form of way buffer 208, and the function class data to a functional class buffer 210 for temporary storage.

The data stored in each buffer 204-210 may be subsequently sent to a corresponding extractor for further analysis and processing. In the present example, the road sign and traffic light data 204 stored in the sign buffer 204 may be sent to a sign extractor 212; the speed limit data stored in the speed limit buffer 206 may be sent to a speed limit extractor 214; the form of way data stored in the form of way buffer 208 may be sent to a form of way extractor 216; and the functional class data stored in the functional class buffer 210 may be sent to a functional class extractor 218 analysis.

The road type module 200 may further include a route and distance calibrator 220 configured to determine a most probable path by calculating path probability for one or more possible vehicle route from the current location of the vehicle 102. The path probabilities may be calculated using various factors such as vehicle route history, user calendar entry or the like. The route and distance calibrator 220 may be further configured to adjust the look ahead distance using parameters such as vehicle speed received from the vehicle speed sensor 182, current and predicted road types or the like. For instance, responsive to detecting an increase in the average vehicle speed or a highway road type, the route and distance calibrator 220 may increase the lookahead distance, and responsive to detecting a decrease in the average vehicle speed or a city road type, the route and distance calibrator 220 may decrease the lookahead distance. The most probable path, the path probabilities and the adjusted lookahead distance may be provided to the extractors 212-218 to facilitate the classification extraction. Each extractor 212-218 may individually determine a road type classification based on the individual input. For instance, the sign extractor may perform road sign density calculations to closely predict an upcoming road type within the look ahead distance and output a road sign and traffic light classification output to a road type constructor 222. The path probabilities and the adjusted lookahead distance may be used to form confidence assessment to generate and output a confidence rating to improve robustness of the system. Similarly, the speed limit extractor 214 may extracts the road sign and traffic light input data and output a road sign and traffic light classification along with a confidence rating to the road type constructor 222. The form of way extractor 216 may extract the form of way input data and output a form of way classification along with a confidence rating to the road type constructor 222. The functional class extractor 218 may extract the functional class input data and output a functional class classification along with a confidence rating to the constructor 222. The road type constructor 222 may arbitrate the classifications and confidence ratings received from each of the extractors 212-218 to predict a road type within the lookahead distance on the most probable path. For instance, different weights may be assigned to outputs from different extractors 212-218 to facilitate the arbitration at the constructor 222. In addition, higher confidence ratings may increase the weight of the respective extractor output. Different input data entries may be associated with different confidence ratings due to the varying quality of input data. For instance, the road sign and traffic light input data may be of a lower confidence rating in an area where construction work is present resulting in more temporary signs. Alternatively, the road type constructor 222 may simultaneously predict the road type for multiple paths having a path probability above a predefined threshold.

The road type may be output from the constructor 222 to the PCM 180 for powertrain operation adjustment. For instance, under a city road driving condition where stop signs and traffic signals are often, the PCM 180 for a hybrid electric vehicle may be configured to operate the vehicle 102 more dependent upon the electric machine powered by a traction battery (not shown) to save fuel and reduce emission. In other words, the PCM 180 may more actively pull down and less actively pull up the internal combustion engine during the city driving such that the vehicle 102 is propelled more often in the electric mode. Under a highway driving condition, the PCM 180 may be configured to more dependent on the vehicle engine to provide better performance. In an alternative example, the PCM 180 may be configured to adjust the transmission operating based on the road types. The PCM 180 may more actively perform downshift responsive to a throttle pedal input signal in the city to adapt to the changing speed in the city, and less actively perform downshift on the highway.

Figure 3:
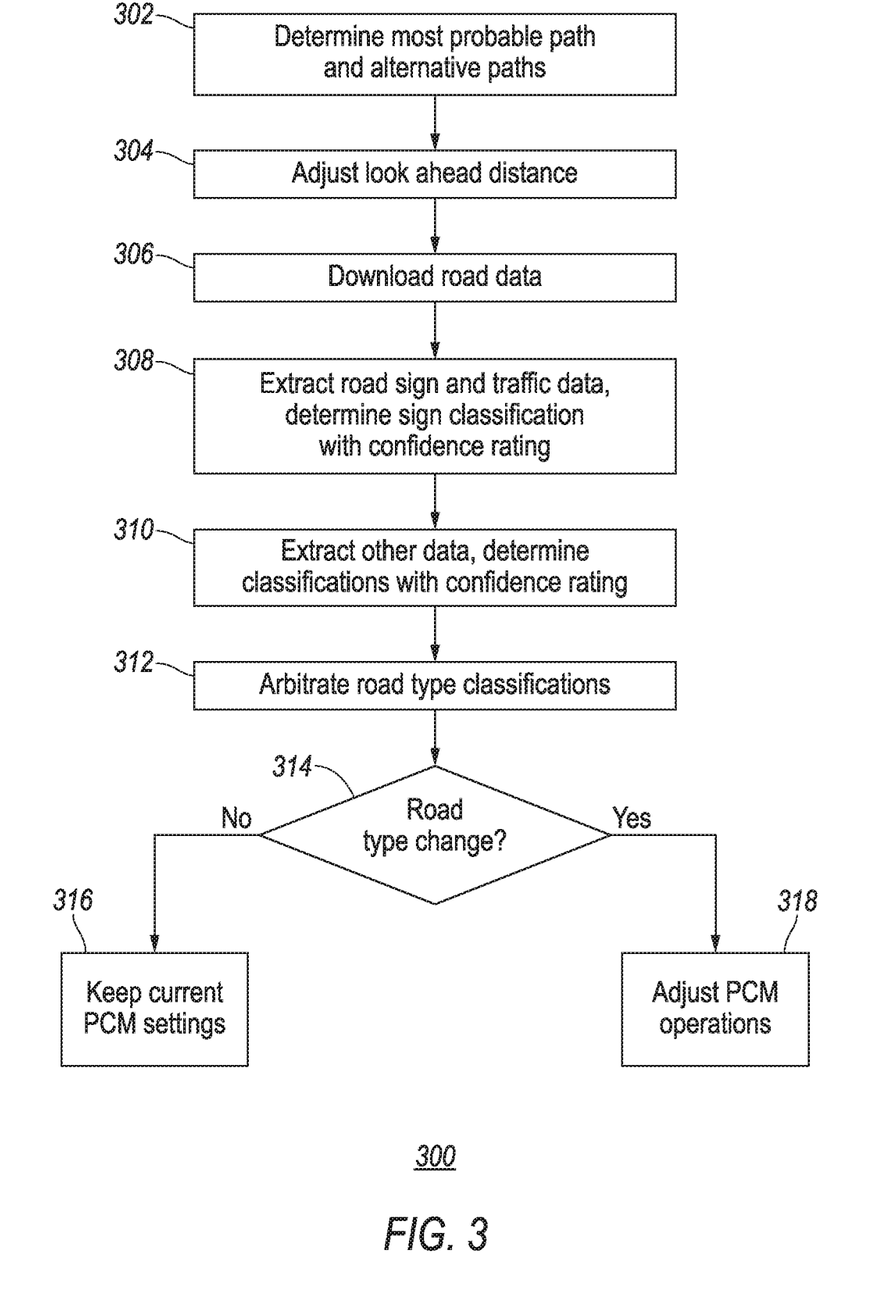
FIG. 3 illustrates an example flow diagram of a process for predicting road types of one embodiment of the present disclosure.

Referring to FIG. 3, an example flow diagram of a process 300 for predicting road types of one embodiment of the present disclosure is illustrated. With continuing reference to FIGS. 1-2, the process 300 may be implemented via various components of the road type module 200. Some operations in the process 300 have already been introduced in the discussion with reference to FIG. 2 and therefore will not be repeated in detail here. At operation 302, the route and distance calibrator 220 determines the most probable path as well as one or more alternative path based on the current location of the vehicle 102. As discussed above, the route and distance calibrator 220 may further send the paths to the mobile device 128 and request the mobile device 128 to download road data associated with the paths in advance. At operation 304, the route and distance calibrator 220 adjusts the lookahead distance based on various factors and outputs an adjusted lookahead distance. At operation 306, the TCU 170 downloads the road data for the most probable path and the alternative paths from the remote server 176. The road data may include the road sign and traffic light data, the speed limit data, the form of way data, and the functional class data. At operation 308, the sign extractor 212 extracts the road sign and traffic light data and calculates a sign and traffic light density within the lookahead distance on the one or more routes. The sign extractor 212 further determines the road type classification based on the sign and traffic light density with the confidence rating. In the present embodiment, the road type classification based on the sign and traffic light density may be given the greatest weight although the present disclosure is not limited thereto. At operation 310, other extractors 214-218 extract the input road data and outputs a road type classification along with the confidence rating respectively. At operation 312, responsive to receiving the road type classifications from the various extractors 212-218, the road type constructor predicts the road type within the lookahead distance by arbitrating the plurality of road type classifications using the corresponding weights and confidence ratings. If the predicted road type is the same as the current road type, the process proceeds from operation 314 to operation 316 and the PCM keeps the current settings unchanged. Otherwise, if the predicted road type is different from the current road type, the process proceeds to operation 318 and the PCM adjust the powertrain settings based on the newly predicted road type.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   an engine;
   an electric machine;
   a transceiver, programmed to communicate with a server; and
   a controller, programmed to
      responsive to identifying a route, obtain road data associated with the route via the transceiver, wherein the road data include locations of stop signs and traffic lights, and speed limit information within a lookahead distance on the route,
      identify a sign classification using a sign and traffic light density calculated using a total number of stop signs and traffic lights within the lookahead distance on the route,
      identify a speed classification using the speed limit information,
      identify a road type classification as a city road type classification using the sign classification and the speed classification, wherein the sign classification is assigned with a first weight and the road type classification is assigned with a second weight less than the first weight, and
      responsive to identifying the road type classification as being a city road type classification, adjust a drivetrain of the vehicle to reduce engine operation and increase electric machine operation to propel the vehicle.

2. The vehicle of claim 1, wherein the controller is further programmed to:
   responsive to detecting a vehicle speed is above a first speed threshold, increase the lookahead distance; and
   responsive to detecting the vehicle speed is below a second speed threshold, decrease the lookahead distance.

3. The vehicle of claim 1, wherein the transceiver is further programmed to communicate with a mobile device, the controller is further programmed to:
   responsive to planning the route, instruct the mobile device to download the road data associated with the route, and
   obtain the road data from the mobile device as the vehicle traverses on the route.

4. The vehicle of claim 3, wherein the controller is further programmed to:
   predict the vehicle is to traverse the route at a start time; and
   instruct the mobile device to download the road data before the start time.

5. The vehicle of claim 1, wherein the sign classification is associated with a first confidence rating and the road type classification is associated with a second confidence rating, the controller is further programmed to:
   adjust the first and second weights using the first and second confidence ratings.

6. The vehicle of claim 1, wherein the controller is further programmed to:
   responsive to detecting the city road type, decrease the lookahead distance.

7. The vehicle of claim 1, wherein the controller is further programmed to:
   responsive to determining the sign and traffic light density within the lookahead distance is below a threshold indicative of a highway road type classification, adjust a drivetrain of the vehicle to increase engine operation.

8. The vehicle of claim 1, wherein the road data further includes a form of way indicator and a function class indicator.

9. A method for a vehicle, comprising:
   responsive to identifying a route, obtaining road data associated with the route via a transceiver, wherein the road data include locations of traffic controls, and speed limit information within a lookahead distance on of the route; and
   identify a traffic control classification using a traffic control density calculated using a total number of traffic controls within the lookahead distance on the route;
   identifying a road type classification using the traffic control classification;
   adjusting a vehicle powertrain setting using the road type classification;
   identifying a speed classification using the speed limit information; and
   identifying the road type classification using both the traffic control classification and the speed classification, wherein the traffic control classification is associated with a first weight and the speed classification is associated with a second weight less than the first weight.

10. The method of claim 9, further comprising:
    responsive to planning the route, instructing a mobile device wirelessly connected to the vehicle to download the road data associated with the route, and
    obtaining the road data from the mobile device as the vehicle traverses on the route.

11. The method of claim 10, further comprising:
    instructing the mobile device to download the road data before the vehicle is predicted to start traversing the route.

12. A system for a vehicle, comprising:
a transceiver, programmed to communicate with a server; and
a controller, programmed to
- responsive to identifying a route, obtain road data associated with the route via the transceiver, wherein the road data include locations of stop signs and traffic lights and speed limit information within a lookahead distance on of the route, and
- identify a sign classification using a sign and traffic light density calculated using a total number of stop signs and traffic lights within the lookahead distance on the route,
- identify a speed classification using the speed limit information,
- identify a road type classification using the sign classification and the speed classification, wherein the sign classification is assigned with a first weight and the speed classification is assigned with a second weight less than the first weight, and
- adjust a vehicle powertrain setting using the road type classification.

13. The system of claim 12, wherein the controller is further programmed to:
- responsive to planning the route, instruct a mobile device to download the road data associated with the route, and
- obtain the road data from the mobile device as the vehicle traverses on the route.

14. The system of claim 12, wherein the controller is further programmed to instruct a mobile device to download the road data before a predicted time when the vehicle is predicted to start traversing the route.

15. The system of claim 12, wherein the sign classification is associated with a first confidence rating and the road type classification is associated with a second confidence rating, the controller is further programmed to:
- adjust the first and second weights using the first and second confidence ratings.

* * * * *